United States Patent
First et al.

(10) Patent No.: US 7,505,499 B2
(45) Date of Patent: Mar. 17, 2009

(54) SLAB LASER AMPLIFIER WITH PARASITIC OSCILLATION SUPPRESSION

(75) Inventors: Craig First, Arlington, MA (US);
Xinbing Liu, Acton, MA (US)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 11/013,203

(22) Filed: Dec. 15, 2004

(65) Prior Publication Data

US 2006/0126685 A1 Jun. 15, 2006

(51) Int. Cl.
*H01S 3/14* (2006.01)

(52) U.S. Cl. .......................... 372/39; 372/66

(58) Field of Classification Search .................. 372/39, 372/66

See application file for complete search history.

(56) References Cited

U.S. PATENT DOCUMENTS 5,651,021 A * 7/1997 Richard et al. ................ 372/92

2004/0013151 A1 * 1/2004 Sumida et al. ................ 372/72
2004/0240500 A1 * 12/2004 Mercer ........................ 372/39

* cited by examiner

*Primary Examiner*—Dung T Nguyen
(74) *Attorney, Agent, or Firm*—Harness, Dickey & Pierce, PLC

(57) ABSTRACT

A slab laser amplifier with parasitic oscillation suppression has a plurality of angled pump faces related to one another in order to decrease likelihood of parasitic oscillations, with internal beam incidence angles at total internal reflection that alleviate need for reflective coatings. No polished surfaces of gain material comprising the amplifier are parallel to one another. A beam path within the gain material is such that all incident angles of the beam path upon the two main faces and the common end face are greater than a critical angle required for total internal reflection, thereby alleviating need for reflective coatings. Based on an index of refraction of the gain material, and based on a diameter of the laser beam, dimensions of the gain material are selected to maximize beam overlap in a pumped volume of the gain material.

18 Claims, 6 Drawing Sheets

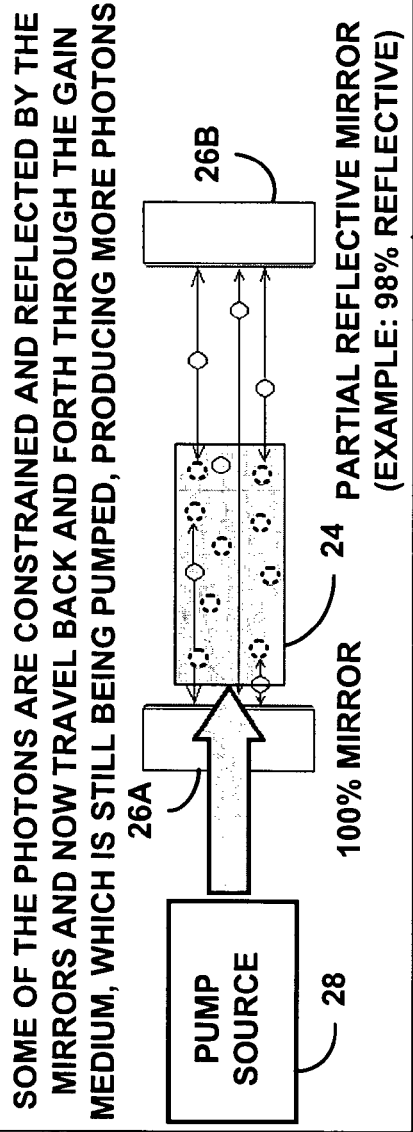
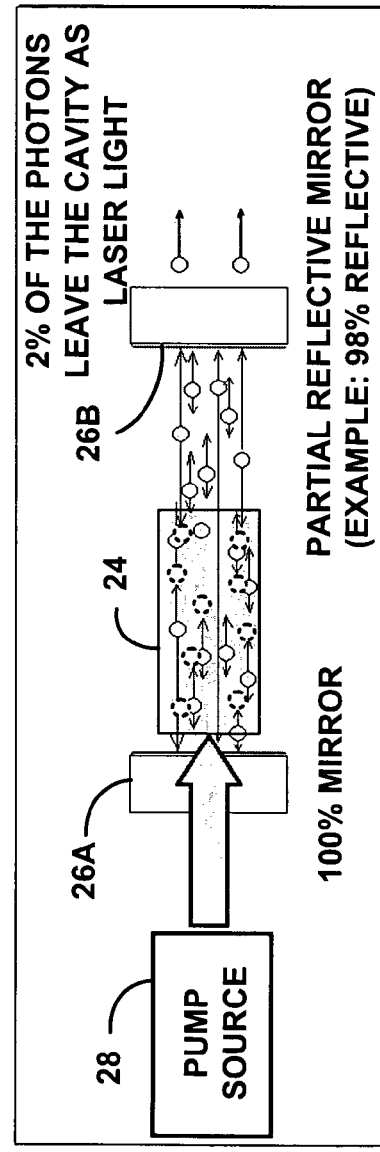

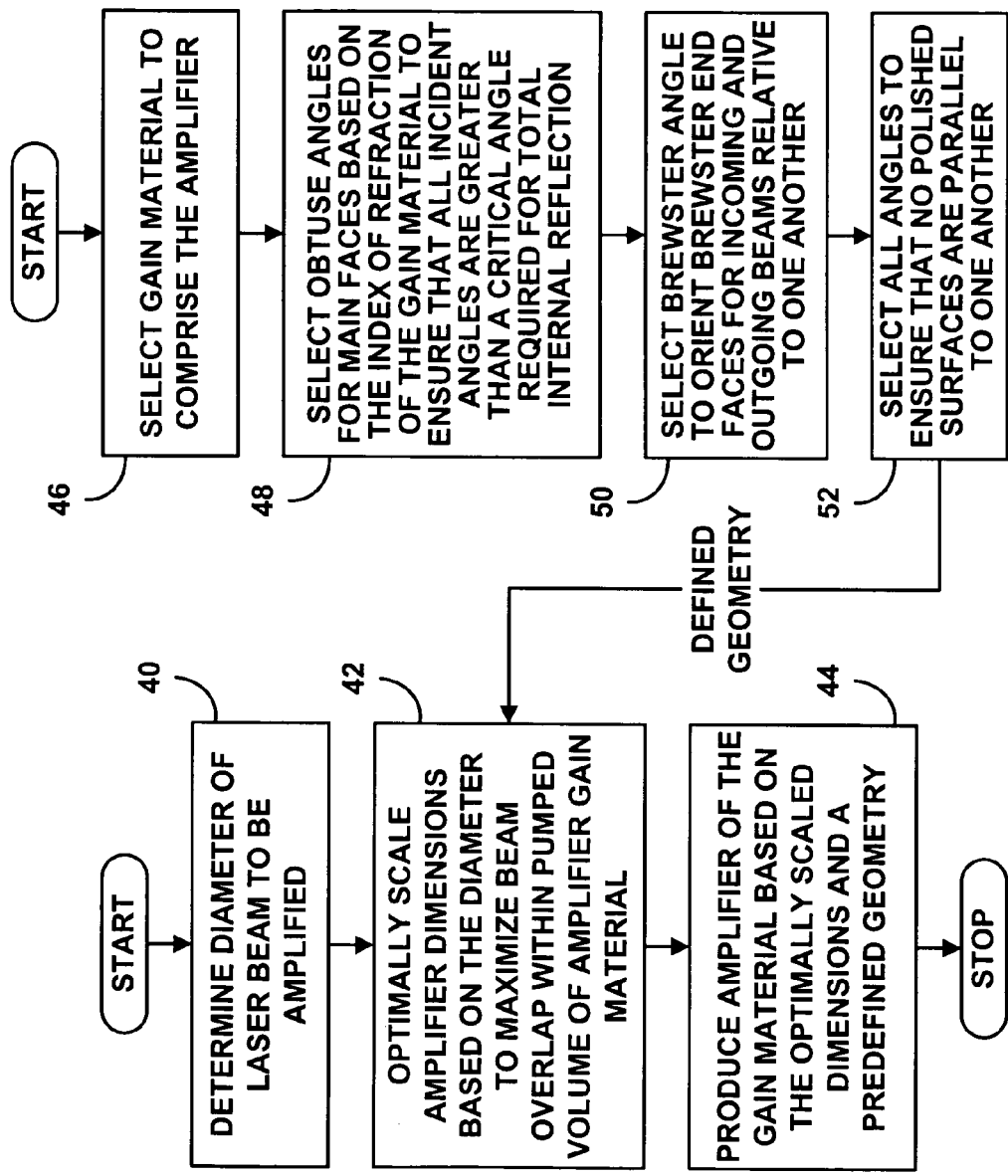

SLAB LASER AMPLIFIER WITH PARASITIC OSCILLATION SUPPRESSION

FIELD OF THE INVENTION

The present invention generally relates to slab laser amplifiers, and relates in particular to a slab laser amplifier with parasitic oscillation suppression.

BACKGROUND OF THE INVENTION

Slab amplifiers are often used to boost output of a laser system by providing extractable energy from a pumped gain medium. The large surface area of the slab allows the pump energy to be spread over a wide volume of gain material to reduce heat effects. In general, a zig-zag pattern or tightly folded resonator (TFR) design makes use of multiple beam passes through the gain material to extract energy from the pumped region of the crystal.

Referring to FIGS. 1-6, a brief overview is provided of how a laser amplifier works in accordance with the prior art. In FIGS. 1-4, a basic laser cavity 22 includes gain material 24. The cavity 22 also has at least two mirrors 26A and 26B, such as a 100% reflective mirror 26A and a 98% partially reflective mirror 26B. The cavity 22 further has a pump energy source 28, such as a laser diode or flashlamp. FIG. 1 illustrates the cavity 22 and its components in a state of non-operation. In FIG. 2, atoms in the gain material 24 receive energy from the pump source 28, which excites the electrons into higher energy states. When these electrons return to their original energy state they emit a photon. This phenomenon is called spontaneous emission of photons.

Turning now to FIG. 3, as the photons pass through the gain material 24, they also affect the atoms in the gain material 24 by stimulating them to emit more photons while in an energized state. Mirrors 26A and 26B aligned parallel to one another at each end reflect the photons back and forth, continuing this process of stimulated emission and amplification along the same beam path. Referring to FIG. 4, photons from one atom stimulate emission of photons from other atoms and the light intensity is rapidly amplified. A cascade effect occurs, and soon we have propagated many, many photons. This process is called Light Amplification by Stimulated Emission of Radiation, which is where the term "laser" comes from. As a result of one of the end mirrors 26B having less than 100% reflectivity, some of the photons are transmitted through this mirror, and this transmitted portion is the laser's output beam.

Turning now to FIG. 5, a laser cavity 22 has limitations as to how much energy can be extracted from it, depending on available pump energy from source 28, the gain material 24, and other components. So, one way more power can be obtained is to use a second stage amplifier 30. The basic second stage amplifier 30 is much like the basic laser cavity 22, except there are no mirrors to contain the photons. There is a gain material 24 and a pump source 28 that excites the material 24 into an excited state so that there are available photons being emitted. It should be noted that there can be more than one pump source 28, which can be situated on opposite sides of the gain material 24. The large surface area of the slab allows the pump energy to be spread over a wide volume of gain material 24 to reduce localized heat effects.

Referring now to FIG. 6, the laser beam from the laser cavity 22 enters the amplifier pumped gain material 24 of the second stage amplifier 30. As was the case with the laser cavity 22 itself, photons from one atom stimulate emission of photons from other atoms and the light intensity is amplified as it passes through the amplifier gain material 24. It should be readily understood that although a single straight path of the amplified beam through the gain material 24 is shown, many amplifiers make use of a zigzag path, or tightly folded resonator (TFR) through the gain material 24 to make the best use of the excited gain material 24.

One problem encountered in the scenarios described above is that a polished uncoated air/glass interface has about 4% reflectivity. This property of gain material surfaces means that the polished parallel surfaces of the amplifier gain material can act as the mirrors of a laser cavity. This parasitic oscillation thereby depletes the available gain for the beam that we intend to amplify in the first place.

Most of the current solutions to the aforementioned issue make use of anti-reflection (AR) coatings to limit the 4% reflection effect that contributes to parasitic oscillation. Some of these solutions that make use of a zigzag beam path may also employ high-reflection coatings to facilitate reflecting the beam to be amplified off of the surfaces where desired, such as low angle of incidence beam reflections inside of the gain material.

SUMMARY OF THE INVENTION

In accordance with the present invention, a slab laser amplifier with parasitic oscillation suppression has a plurality of angled pump faces related to one another in order to decrease likelihood of parasitic oscillations, with internal beam incidence angles at total internal reflection that alleviate need for reflective coatings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 1-4 are block diagrams of a laser cavity in accordance with the prior art;

FIG. 10 is a flow diagram illustrating a method of manufacturing a slab laser amplifier with parasitic oscillation suppression in accordance with the present invention; and FIG. 11 is a flow diagram illustrating a method of determining a geometry for a slab laser amplifier with parasitic oscillation suppression in accordance with the present invention.

DETAILED DESCRIPTION OF THE PREFERRED EMBODIMENTS

The following description of the preferred embodiments is merely exemplary in nature and is in no way intended to limit the invention, its application, or uses.

In the present invention, we are proposing to create a slab amplifier that is of a particular geometry that does not require additional optical coatings for either parasitic oscillation suppression, or for high efficiency reflection of the beam to be amplified. In particular, angular relation of the angled pump faces to one another minimizes the likelihood of parasitic oscillations. Also, the internal beam incidence angles at TIR (total internal reflection) can alleviate the need for reflective coatings on two polished main faces and a common polished end face of the amplifier used to reflectively direct a beam path of the amplified laser beam within the pumped volume of the gain material of the amplifier.

In some embodiments, the need for reflective coatings on these surfaces can be alleviated to point of complete elimination. In others, the need is alleviated so as to reduce the need respective of at least one portion of at least one of the three aforementioned polished surfaces. Accordingly, that portion, which bounds gain material volume overlapped by the amplified laser beam, does not have to be reflectively coated to achieve total internal reflection of the amplified laser beam. Yet, even in the case of complete elimination of the need for reflective coatings, it is still envisioned that these surfaces can be completely or partially reflectively coated for other reasons, or for no reason.

Figure 1:
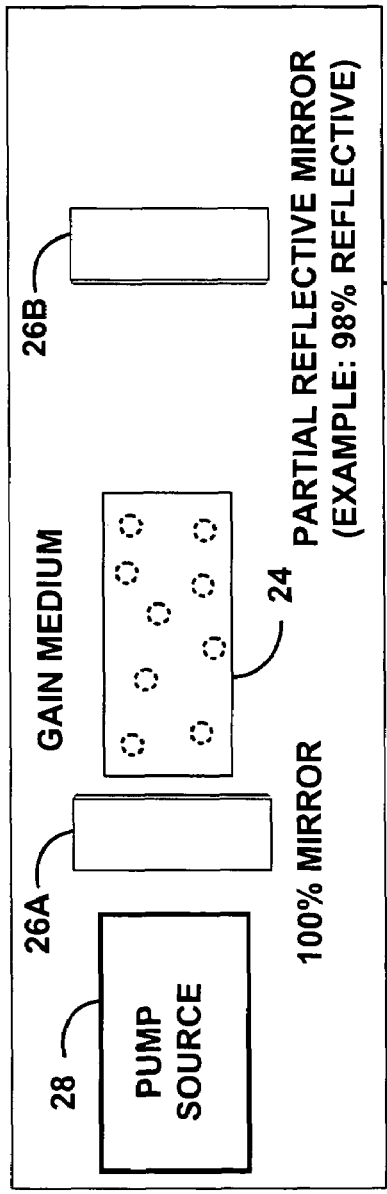
Figure 2:
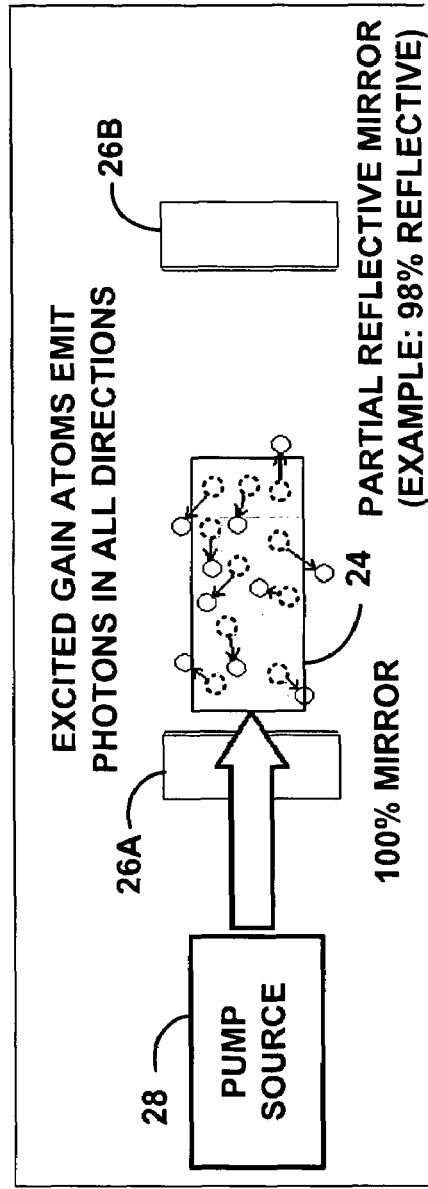
Figure 5:
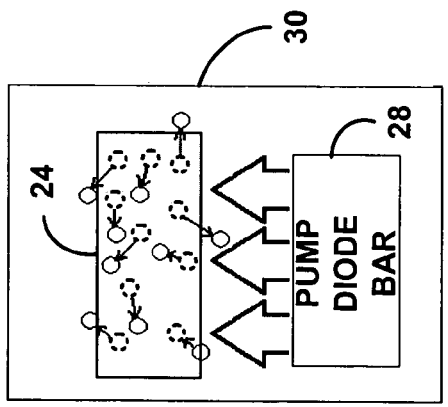
FIGS. 5-6 are block diagrams of a laser amplification system including a laser cavity outputting laser light to a second stage amplifier in accordance with the prior art.
Figure 6:
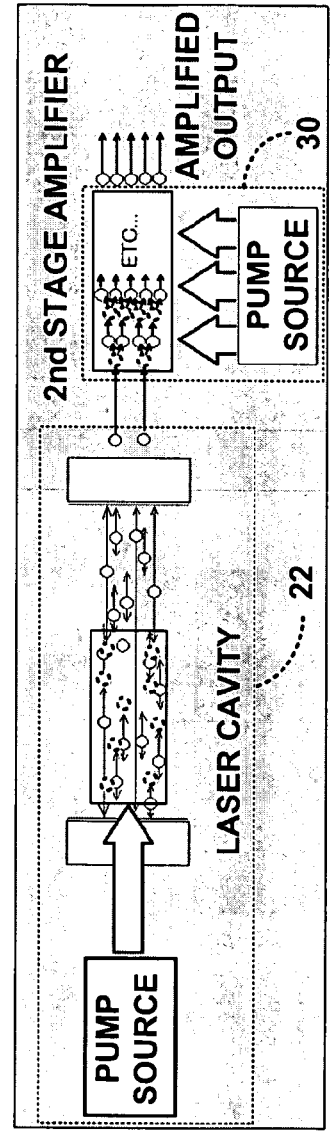
Figure 7:
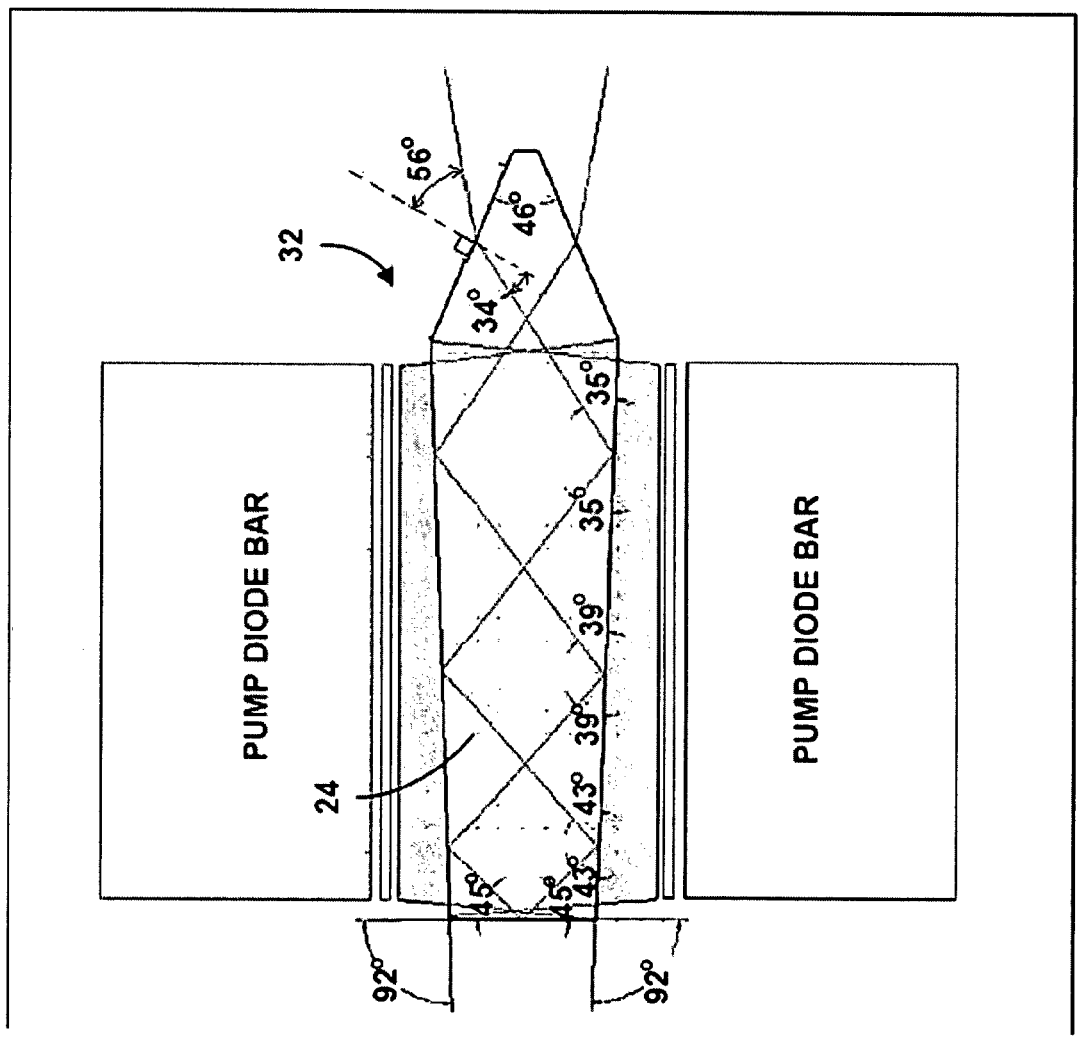
FIGS. 7-9 are top down views of a slab laser amplifier with parasitic oscillation suppression in accordance with the present invention.

Turning now to FIG. 7, a face pumped slab amplifier has a geometry 32 such that none of the crystal polished surfaces are parallel to one another. This geometric constraint reduces the occurrence of parasitic oscillation, which can drastically reduce the energy storage available in the excited gain material 24. The nominal angles shown are for a gain material 24 having an index of refraction of 1.5.

Figure 8:
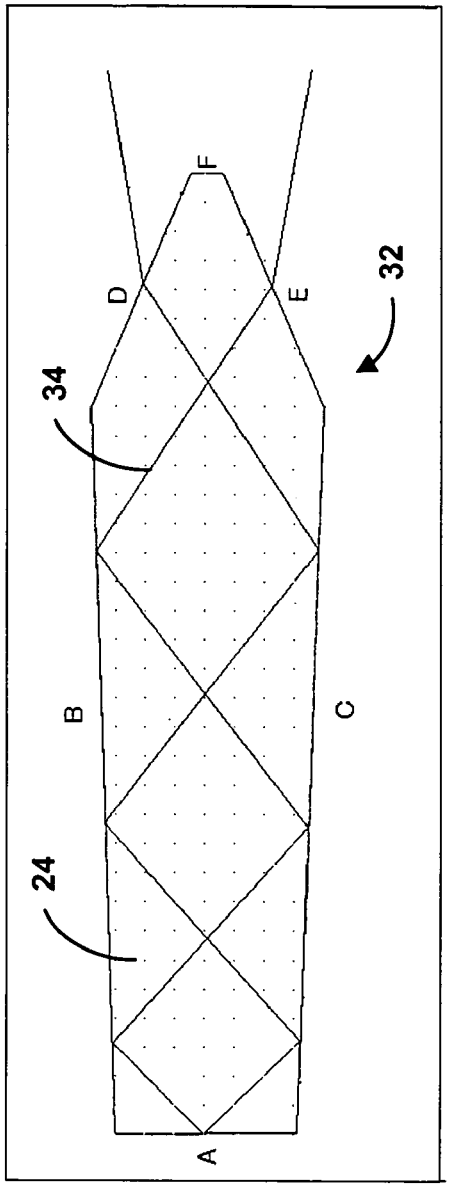

Turning now to FIG. 8, the geometry 32 ensures that the input and output beams having electric field vectors in the plane of incidence (p-polarization) enter and leave the gain material 24 through Brewster end faces D and E at Brewster's angle. This orientation reduces insertion loss, while maintaining preferential polarization of the laser cavity. Main faces B and C and common end face A are polished surfaces, as are Brewster end faces D and E. Face F, however, is not a polished surface.

The two main faces B and C of the gain material 24 are angled slightly with respect to common end face A of the gain material at angles greater than 90 degrees. A beam path 34 within the gain material is such that all of the incident angles of the beam in relation to sides A, B, and C are greater than the critical angle required for total internal reflection, based upon the index of refraction of the gain material 24. Thus, no reflective coatings are necessary.

The beam also reflects off of common end face A of the gain material 24 so that the beam returns along the length of the crystal in a zigzag path opposite the one it passed through upon entering the crystal. This geometric constraint maximizes the overlap of the beam mode and the pumped regions of the gain material.

Figure 9:
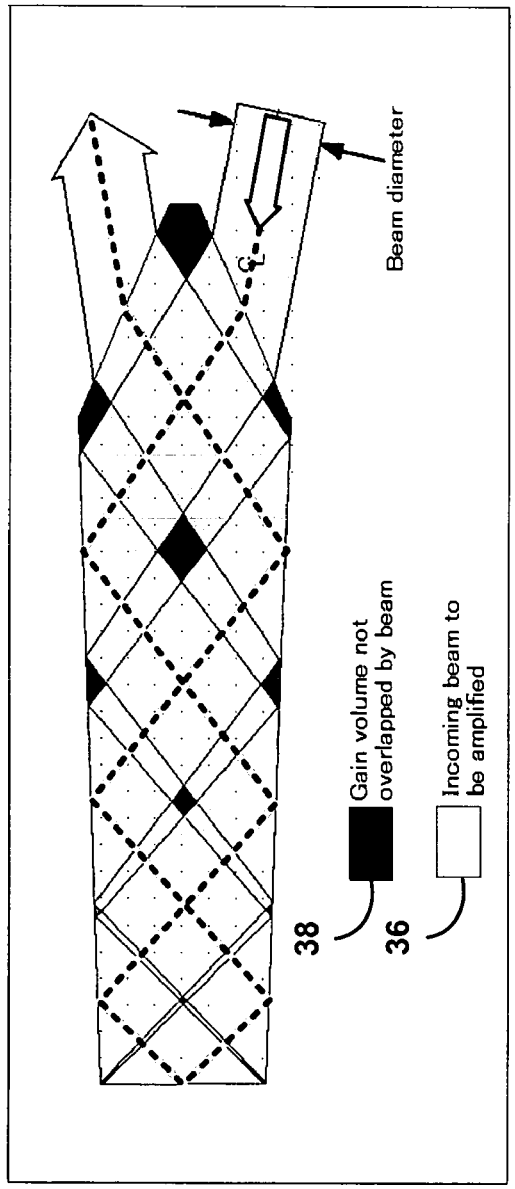

Turning now to FIG. 9, the size of the crystal is determined by maximizing beam overlap of the pumped volume inside the gain material with the incoming beam 36 diameter while maintaining the above mentioned geometry. Maximization of the region of beam overlap is equivalent to minimization of the total volume of regions 38 of beam non-overlap. The gain material height, width and length are optimally scaled for a particular beam diameter.

An example of dimensions for gain material comprised of a crystal block are now described. Assume a beam of 2 mm diameter is to be amplified. Returning to FIG. 8, the rough dimensions of the block viewed from above are 3 mm in height, 3 mm in width at side A, and roughly 12-15 mm long. FIGS. 7-9 show the slab block from above, with the optical polished surfaces A-E located around the perimeter. The top and bottom surfaces of the slab block (not shown) do not have a polished surface, nor does side F, as mentioned above.

Turning now to FIG. 10, a method of manufacture for a slab laser amplifier with parasitic oscillation suppression starts with determining a diameter of a laser beam at step 40. Next, dimensions of gain material comprising the amplifier are optimally scaled in view of the diameter in order to maximize beam overlap in a pumped volume of the gain material at step 42. These dimensions are optimally scaled according to a geometric constraint that a predefined geometry is maintained. The predefined geometry defines a plurality of angled pump faces related to one another in order to decrease likelihood of parasitic oscillations, with internal beam incidence angles at total internal reflection that alleviate need for reflective coatings. Finally, at step 44, the amplifier is produced of the gain material in accordance with the dimensions and the predefined geometry. Surfaces of the amplifier are selectively polished in accordance with the predefined geometry, which also defines which surfaces are polished and which are not.

Turning now to FIG. 11, a method of determining a geometry for a slab laser amplifier with parasitic oscillation suppression starts with selecting a gain material to comprise the amplifier at step 46. Then, based on an index of refraction of the gain material, angles greater than ninety degrees are selected at step 48. These angles relate two main faces of the gain material with respect to a common end face of the gain material. The common end face is oriented opposite from Brewster end faces of the gain material. In step 48, the angles are selected to ensure that a beam path of a laser beam within the gain material is such that all incident angles of said beam path upon the two main faces and the common end face are greater than a critical angle required for total internal reflection. This constraint alleviates the need for reflective coatings. Also, at step 50, an orientation angle for Brewster end faces relative to one another is selected to ensure that input and output beams enter and leave the Brewster end faces at Brewster's angle. This constraint reduces insertion loss while maintaining preferential polarization of a laser cavity within the gain material. Finally, at step 52, any other angles, in addition to the previously selected angles, are selected to ensure that no polished surfaces of the gain material are parallel to one another, thereby reducing occurrence of parasitic oscillation in said gain material. The resulting defined geometry is then used in the method of manufacture for a slab laser amplifier with parasitic oscillation suppression of FIG. 10. In particular, this predefined geometry can be used in step 42 in optimally scaling the dimensions, and further used in step 44 as detailed above in producing the amplifier.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A slab laser amplifier with parasitic oscillation suppression, comprising:
   a plurality of angled pump faces arranged according to a polygonal geometry, said pump faces related to one another in order to decrease likelihood of parasitic oscillations, with internal beam incidence angles at total internal reflection that alleviate need for reflective coatings, including (1) an end face opposite from least one: (a) beam entry face; or (b) beam exit face; and (2) (a) a first main face of gain material comprising said amplifier and abutting the end face; and (b) a second main face of gain material comprising said amplifier and abutting the end face, wherein said first main face and said second main face are flat, side-pumped main faces and an entirety of the first main face is angled with respect to an entirety of the second main face, thereby ensuring that the first main face and the second main face are never parallel to one another.

2. The amplifier of claim 1, said geometry ensuring that all polished surfaces of gain material comprising said amplifier are never parallel to one another, thereby reducing occurrence of parasitic oscillation in said gain material.

3. The amplifier of claim 2, said geometry ensuring that input and output beams enter and leave Brewster end faces of said gain material at Brewster's angle, thereby reducing insertion loss while maintaining preferential polarization of a laser cavity.

4. The amplifier of claim 3, wherein said preferential polarization is one with electric field vector of a laser beam being amplified in a plane of incidence.

5. The amplifier of claim 1, said amplifier geometry ensuring that input and output beams enter and leave Brewster end faces of gain material comprising said amplifier at Brewster's angle, thereby reducing insertion loss while maintaining preferential polarization of a laser cavity.

6. A slab laser amplifier with parasitic oscillation suppression, comprising:
a plurality of angled pump faces, said pump faces related to one another in order to decrease likelihood of parasitic oscillations, with internal beam incidence angles at total internal reflection that alleviate need for reflective coatings,
said amplifier having a geometry wherein no polished surfaces of gain material comprising said amplifier are parallel to one another, thereby reducing occurrence of parasitic oscillation in said gain material,
said geometry ensuring that input and output beams enter and leave Brewster end faces of said gain material at Brewster's angle, thereby reducing insertion loss while maintaining preferential polarization of a laser cavity,
said geometry ensuring that two main faces of said gain material are angled greater than ninety degrees with respect to a common end face of said gain material, said common end face opposite from said Brewster end faces, thereby ensuring, based upon an index of refraction of said gain material, that a beam path within said gain material is such that all incident angles of said beam path upon said two main faces and said common end face are greater than a critical angle required for total internal reflection, thereby alleviating need for reflective coatings.

7. The amplifier of claim 6, said geometry ensuring that said beam further reflects off of said common end face of said gain material so that said beam returns along a length of said gain material in a zig-zag path opposite a path it passed through upon entering said gain material, thereby maximizing beam overlap in a pumped volume of said gain material.

8. The amplifier of claim 7, wherein a size of said gain material is selected to maximize said beam overlap in said pumped volume while maintaining said geometry, height, width, and length of said gain material being optimally scaled for a particular beam diameter.

9. A slab laser amplifier with parasitic oscillation suppression, comprising:
a plurality of angled pump faces, said pump faces related to one another in order to decrease likelihood of parasitic oscillations, with internal beam incidence angles at total internal reflection that alleviate need for reflective coatings,
said amplifier having a geometry ensuring that two main faces of gain material comprising said amplifier are angled greater than ninety degrees with respect to a common end face of said gain material, said common end face opposite from Brewster end faces of said gain material, thereby ensuring, based upon an index of refraction of said gain material, that a beam path within said gain material is such that all incident angles of said beam path upon said two main faces and said common end face are greater than a critical angle required for total internal reflection, thereby alleviating need for reflective coatings.

10. The amplifier of claim 9, said amplifier geometry ensuring that a beam reflects off of the end face of said gain material so that said beam returns along a length of said gain material in a zig-zag path opposite a path it passed through upon entering said gain material, thereby maximizing beam overlap in a pumped volume of said gain material.

11. The amplifier of claim 9, wherein a size of gain material comprising said amplifier is selected to maximize beam overlap in a pumped volume of said gain material while maintaining said geometry of said angled pump faces, height, width, and length of said gain material being optimally scaled for a particular beam diameter.

12. A method of manufacture for a slab laser amplifier with parasitic oscillation suppression, comprising:
determining a diameter of a laser beam;
optimally scaling dimensions of gain material comprising said amplifier in view of the diameter in order to maximize beam overlap in a pumped volume of said gain material while maintaining a predefined, polygonal geometry, wherein said predefined geometry includes a plurality of angled pump faces, said pump faces related to one another in order to decrease likelihood of parasitic oscillations, with internal beam incidence angles at total internal reflection that alleviate need for reflective coatings; and
producing said amplifier of said gain material in accordance with the dimensions and the predefined geometry, wherein said predefined geometry ensures that no polished surfaces of said gain material are ever parallel to one another, including flat, side-pumped main faces thereof which are angled greater than ninety degrees with respect to a common end face thereof, thereby reducing occurrence of parasitic oscillation in said gain material.

13. The amplifier of claim 12, wherein said predefined geometry ensures that input and output beams enter and leave Brewster end faces of said gain material at Brewster's angle, thereby reducing insertion loss while maintaining preferential polarization of a laser cavity.

14. The amplifier of claim 12, wherein said predefined geometry ensures that said beam further reflects off of a common end face of said gain material so that said beam returns along a length of said gain material in a zig-zag path opposite a path it passed through upon entering said gain material, thereby maximizing beam overlap in a pumped volume of said gain material.

15. A method of manufacture for a slab laser amplifier with parasitic oscillation suppression, comprising:
determining a diameter of a laser beam;
optimally scaling dimensions of gain material comprising said amplifier in view of the diameter in order to maximize beam overlap in a pumped volume of said gain material while maintaining a predefined geometry, wherein said predefined geometry includes a plurality of angled pump faces, said pump faces related to one another in order to decrease likelihood of parasitic oscillations, with internal beam incidence angles at total internal reflection that alleviate need for reflective coatings; and producing said amplifier of said gain material in accordance with the dimensions and the predefined geometry, wherein said predefined geometry ensures that two main faces of said gain material are angled greater than ninety degrees with respect to a common end face of said gain material, said common end face opposite from Brewster end faces of said gain material, thereby ensuring, based upon an index of refraction of said gain material, that a beam path within said gain material is such that all incident angles of said beam path upon said two main faces and said common end face are greater than a critical angle required for total internal reflection, thereby alleviating need for reflective coatings.

16. A method of determining a geometry for a slab laser amplifier with parasitic oscillation suppression, comprising:

selecting a gain material to comprise said amplifier;

based on an index of refraction of said gain material, selecting angles greater than ninety degrees, wherein said angles relate two main faces of said gain material with respect to a common end face of said gain material, said common end face opposite from Brewster end faces of said gain material, wherein said angles are selected to ensure that a beam path of a laser beam within said gain material is such that all incident angles of said beam path upon said two main faces and said common end face are greater than a critical angle required for total internal reflection, thereby alleviating need for reflective coatings.

17. The method of claim 16, further comprising selecting an orientation of said Brewster end faces relative to one another to ensure that input and output beams enter and leave said Brewster end faces of said gain material at Brewster's angle, thereby reducing insertion loss while maintaining preferential polarization of a laser cavity.

18. The method of claim 16, further comprising selecting said angles to ensure that no polished surfaces of said gain material are parallel to one another, thereby reducing occurrence of parasitic oscillation in said gain material.

* * * * *